May 24, 1932.  T. C. LONNQUEST ET AL  1,859,569
APPARATUS FOR DETERMINATION OF DRIFT BY AIRCRAFT
Filed May 28, 1931  2 Sheets-Sheet 2
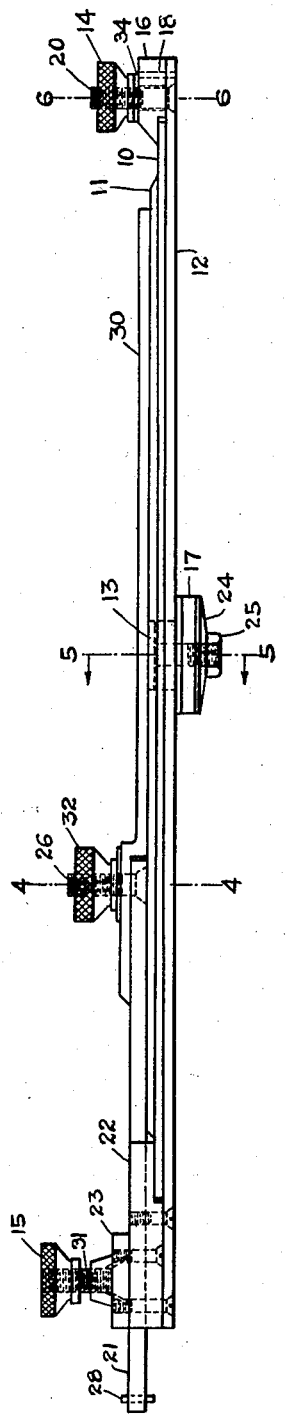
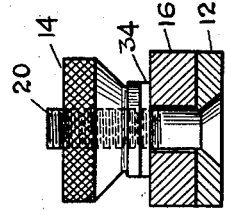
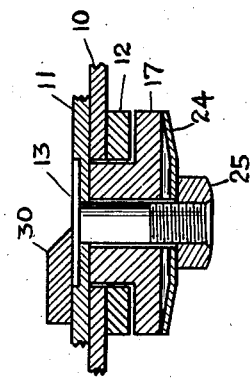
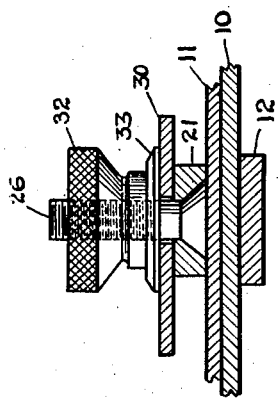
INVENTORS.
THEODORE C. LONNQUEST
AND CLARENCE L. SEWARD, JR.
BY Robert A. Lavender ATTORNEY Patented May 24, 1932

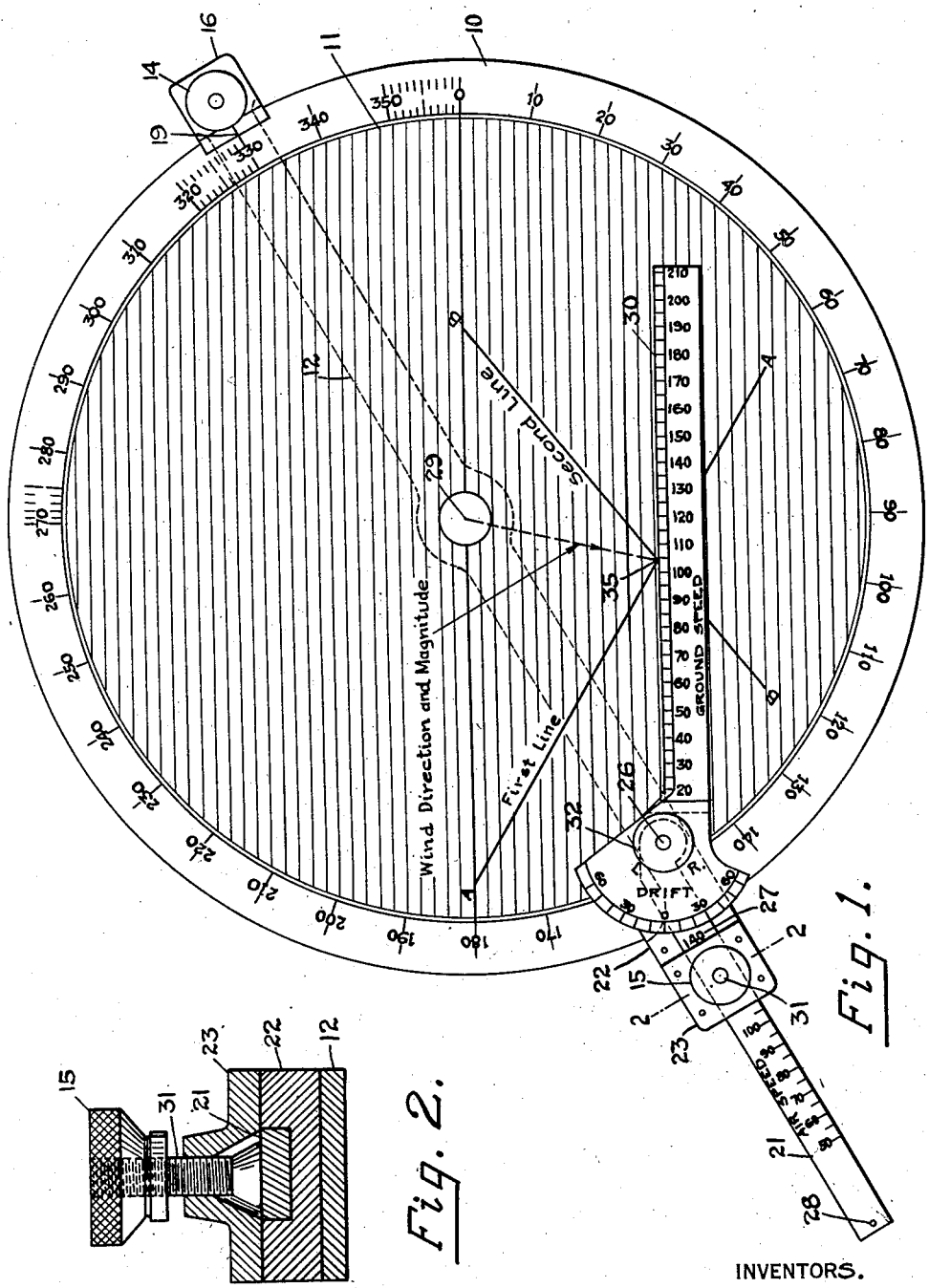

1,859,569

UNITED STATES PATENT OFFICE

THEODORE C. LONNQUEST, OF THE UNITED STATES NAVY, AND CLARENCE L. SEWARD, JR., OF WASHINGTON, DISTRICT OF COLUMBIA

APPARATUS FOR DETERMINATION OF DRIFT BY AIRCRAFT

Application filed May 28, 1931. Serial No. 540,758.

(GRANTED UNDER THE ACT OF MARCH 3, 1883, AS AMENDED APRIL 30, 1928; 370 O. G. 757)

This invention relates to improvements in apparatus for determination of drift by aircraft, the apparatus consisting of a ring graduated in degrees with a central opaque disk upon which are mounted a suitable air-speed arm and combined ground-speed arm with drift scale attachment.

The objects of our invention are, first, the use of one air-speed arm, ground-speed arm assembly instead of two.

Second, the extension of the air-speed arm mounting to permit direct setting of the aircraft heading instead of the reciprocal heading.

Third, the offset of the edge of the air-speed arm to permit the use of radial lines from the center of the disk as required in determining wind direction and velocity.

Fourth, the mounting of the centrally pivoted arm on the lower side of the instrument in order not to interfere with the solution of problems involving wind points near the center of the instrument or with small angles of drift.

Fifth, the slidable mounting of the air-speed arm to avoid obstruction of the air-speed scale by the drift scale and to permit solution at low ground speed.

And, sixth, the offsetting of the ground-speed arm to avoid errors in solution formerly introduced due to the width of the pencil lead.

We attain these objects by the instrument illustrated in the accompanying drawings, in which Fig. 1 is a plan view of the instrument;

Fig. 2 is a section through 2—2 of Fig. 1;

Fig. 3 is a view in elevation of the entire instrument;

Fig. 4 is a section through 4—4 of Fig. 3;

Fig. 5 is a section through 5—5 of Fig. 3; and

Fig. 6 is a section through 6—6 of Fig. 3.

Similar numerals refer to similar parts throughout the several views.

Disk 10, Figs. 1, 3, 4 and 5, is graduated in degrees from 0 to 360 in a clockwise direction, said scale being placed near its outer circumference.

Disk 11, Figs. 1, 3, 4 and 5, is rotatably mounted at the center of disk 10. Its diameter is such that its outer circumference is just inside of the scale on disk 10. It is made of a white opaque material, such as white celluloid, with a system of equally-spaced parallel lines marked thereon. The line passing through the center of the disk is appreciably heavier than the other lines. The surface of disk 11 is covered with a thin layer of a transparent material, such as celluloid, through which said lines are clearly visible and the surface of which will take readily a pencil mark. The spacing of said lines corresponds to the spacing of the scales on the air-speed and ground-speed arms.

Arm 12, Figs. 1, 2, 3, 4, 5 and 6, is rotatably mounted on the lower side of disk 10. It is supported by bushing 17 on bolt 13. At one end, arm 12 carries pointer 16 which overlaps disk 10 and may be clamped to it by nut 14 by which arm 12 is held in any position relative to disk 10; at the other end, it carries housing 22 and housing cover 23 through which the air-speed arm 21 slides.

Air-speed arm 21, Figs. 1, 2, 3 and 4, operates in housing 22. The graduated edge of air-speed arm 21 when extended passes through the center of screw 26, the center of disks 10 and 11, and index mark 19. The distance between zero on the scale on air-speed arm 21 and the reading which is opposite index mark 27, is equal to the distance from point 29, the center of disks 10 and 11, to the center of screw 26. The reading opposite index mark 27 is adjusted as desired to indicate the air-speed. Pin 28, Figs. 1 and 3, prevents air-speed arm 12 from slipping out of housing 22 and housing cover 23.

Ground-speed drift arm 30, Figs. 1, 3 and 4, is pivoted on screw 26 so that the extension of a pencil line, drawn with the edge carrying the ground-speed scale as a guide, will pass through the center of screw 26. The drift scale attachment at one end of arm 30 has the drift scale graduated on an edge which is the arc of a circle of which the center is the center of screw 26. The drift scale is graduated in degrees right and left from the center. When the 0 of the drift scale is set on the graduated edge of the air-speed arm, the ground-speed and air-speed arms are parallel. Any other setting indicates the angle between the two arms.

Fig. 2 shows screw 31 for securing air-speed arm 21 at the desired setting. Thumb-nut 15 is sweated to screw 31.

Fig. 4 shows screw 26 with washer 33 and thumb-nut 32 for securing air-speed arm 21 and ground-speed and drift arm 30 at the desired drift angle setting.

Fig. 5 shows bolt 13 flush with disk 11 and washer 24 with nut 25 for securing bushing 17. Bushing 17 supports disk 10 and arm 12. Bolt 13 and disk 11 are secured together.

Fig. 6 shows screw 20 and thumb-nut 14 for securing pointer 16 and arm 12 at any desired setting on disk 10. Two pins 18 prevent pointer 16 from turning on screw 20.

The graduations on the ground-speed arm and air-speed arm are to the same scale. The separation of the lines on disk 11 is equal to five units.

The operation of our invention is as follows:

Set the heavy line on disk 11 on the course desired to be made good as indicated on the scale on disk 10. Set index mark 19 also on the course desired to be made good. Set air-speed arm 21 so that index mark 27 is opposite the air speed as indicated by the air-speed meter. Set ground-speed and drift arm 30 to the drift angle for this course, right or left, as indicated on the drift scale, the drift angle having been determined by a separate instrument. The drift angle being the angle between the course steered and the course made good.

We now have two sides of the velocity triangle; namely, the air-speed line and the ground-speed line. The closing side of the triangle is the wind-speed line. One end of the wind-speed line must originate at point 29, the center of the instrument which is one end of the air-speed line, and the other end of the wind-speed line must be somewhere along the ground-speed line. To complete the solution, an additional determination on a new heading is required. This second heading should differ from the first by an amount sufficient to give a good graphic intersection between the two ground-speed lines. Preferred in this respect is a change of heading into the wind equal to at least twice the first drift angle.

Draw the first ground-speed line A—A on disk 11 with a pencil. Maintain disk 11 on the first setting. Set index mark 19 on the new course. The same air speed must be made on the new course. Set ground-speed and drift arm 30 to the drift angle for the new course, right or left, as indicated by the new course, right or left, as indicated by the drift scale. The drift angle having been determined by a separate instrument. Draw in the second ground-speed line B—B. The intersection of said lines A—A and B—B at 35 is called the wind point. This determines the remaining side of both velocity triangles. It is the line between points 29 and 35 and represents the force and direction of the wind; the direction being from point 29 to point 39.

To measure the force and direction of the wind set the ground-speed and drift arm 30 to a drift scale reading of zero, maintain disk 11 to its original setting, rotate arm 12 until arm 30 is parallel to the wind-speed line, whereby index mark 19 will indicate the direction of the wind and the force of the wind can be measured by the scale on the ground-speed arm.

To determine the course to steer to make good the desired course, unlock ground-speed and drift arm 30 and arm 12; set air-speed arm 21 to indicate the speed at which it is desired to fly; maintain disk 11 on its original setting and rotate arm 30 and arm 12 simultaneously until arm 30 is aligned parallel to the lines of disk 11 and at the same time a pencil line drawn with the graduated edge of arm 30 as a guide passes through the wind point 35. Index mark 19 will then point out the correct course to steer to make good the desired track. The ground speed along this track is read from the ground-speed arm scale at the wind point.

The above is the one-speed-two-course method, which is preferred. It is obvious that the same result may be accomplished by a one-course-two-speed method wherein two observations of the angle of drift are taken at two substantially different speeds and the velocity triangles plotted.

It will be understood that the above description and accompanying drawings comprehend only the general and preferred embodiment of our invention, and that various changes in construction, proportion and arrangement of parts may be made within the scope of the appended claims, and without sacrificing any of the advantages of our invention.

The herein described invention may be manufactured and used by or for the Government of the United States for governmental purposes without the payment to us of any royalties thereon.

What we claim is:

1. A drift computer comprising a graduated disk, a second disk rotatably mounted on said graduated disk and bearing a plurality of parallel lines, an arm rotatably mounted on the lower side of said graduated disk, a second arm slidably mounted at one end of said arm and bearing graduations indicative of air speed, said arms being maintained parallel at all times, a third arm rotatably mounted at one end of said second arm and extending over said disks and bearing graduations indicative of ground speed and also bearing graduations indicative of the drift angle.

2. An aerial navigational instrument for the determination of the course to steer to make good a desired course comprising a graduated disk, a second disk pivotally concentrically mounted on said first disk and bearing a plurality of parallel lines, an arm movable about the center of said disks as an axis, each end of said arm extending to the periphery of said disk, a pointer mounted at one end of said arm bearing an index mark indicating the adjustment of said arm relative to said graduated disk, a housing with cover mounted at the other end of said arm, a second arm slidable longitudinally of itself in said housing and bearing graduations indicative of air speed, a third arm movable about a point on said second arm as an axis and bearing graduations indicative of ground speed and also bearing graduations indicative of angular adjustment in said third arm relative to said second arm.

3. An aerial navigational instrument for the determination of the course to steer and to make good a desired course comprising a disk bearing near its circumference graduations of degrees from zero to 360°, a second disk pivotally concentrically mounted on said first disk and bearing a plurality of equally spaced parallel lines, an arm movable about the center of said disks as an axis, each end of said arm extending to the periphery of said disk, a pointer mounted at one end of said arm bearing an index mark indicating the angular adjustment of said arm relative to said graduated disk, a housing with cover mounted at the other end of said arm, a second arm slidable longitudinally of itself in said housing, one edge of said second arm being in alignment with the center of said disks and said index mark, a third arm movable about an axis located at the inner extremity of said second arm and on said aligned edge, the extension of one edge of said third arm passing said axis of said third arm at a distance equal to the width of a pencil line, and bearing graduations indicative of ground speed and also graduations indicative of angular adjustments of said third arm relative to said second arm.

4. An aerial navigational instrument for the determination of the wind point, the force and direction of the wind, and the course to steer to make good a desired course comprising a graduated disk, a second disk pivotally concentrically mounted on said first disk and bearing a system of equally spaced parallel lines, a distinctive line passing through the center of said disk and parallel to the lines of said system, an arm movable about the center of said disks as an axis, a pointer at one end of said arm, a housing with cover at the other end of said arm, there being an index mark on said housing, a second arm slidable longitudinally of itself in said housing and bearing graduations indicative of air speed, said index mark registering on said graduations to give the air speed adjustment, the third arm rotatably mounted on said second arm and bearing graduations indicative of ground speed and also graduations indicative of angular adjustment of said third arm relative to said second arm.

5. An instrument of the class described comprising a graduated disk, a second disk pivotally concentrically mounted on said first disk and bearing a plurality of parallel lines and adapted to receive a pencil mark, an arm movable about the center of said disks as an axis, a pointer at one end of said arm, a housing at the other end of said arm, there being an index mark on said housing, a second arm movable longitudinally in said housing, said movement of one edge of said second arm being radially with respect to the center of said disks, a third arm movable about a point on said radially moving edge of said second arm as an axis, said index mark indicating on said graduations of said second arm the adjustment of said axis of said third arm from the center of said disks, one end of said third arm being expanded into a segmental disk, the center of said segmental disk being at said axis of said third arm, the arc of said segmental disk being graduated into degrees indicative of angular adjustment between said third arm and said second arm, said third arm also bearing graduations indicative of ground speed progressing from said axis of said third arm.

6. An instrument of the class described comprising a graduated disk, a second disk pivotally concentrically mounted on said first disk and bearing a plurality of parallel lines and movable about the center of said disks as an axis, means for securing said second disk in fixed angular relation to said first disk, an arm movable about the center of said disks as an axis, a pointer mounted at one end of said arm, means in combination with said pointer for securing said arm in fixed angular relation to said graduated disk, a housing mounted at the other end of said arm, a second arm slidable longitudinally of itself in said housing and bearing graduations indicative of air speed, means in combination with said housing for securing said second arm in fixed relation to said housing, a third arm movable about an axis at the inner extremity of said second arm, and bearing graduations indicative of ground speed and also graduations indicative of angular adjustment of said third arm relative to said second arm and means for securing said third arm in fixed angular relation to said second arm.

In testimony whereof we have hereunto set our hands.

THEODORE C. LONNQUEST.
CLARENCE L. SEWARD, Jr.